(12) United States Patent
Sekiguchi et al.

(10) Patent No.: US 10,408,300 B2
(45) Date of Patent: Sep. 10, 2019

(54) TOOTHED BELT

(71) Applicant: BANDO CHEMICAL INDUSTRIES, LTD., Kobe-shi (JP)

(72) Inventors: Yuji Sekiguchi, Kobe (JP); Shinji Suzuki, Kobe (JP)

(73) Assignee: Bando Chemical Industries, Ltd., Kobe-shi, Hyogo (JP)

( * ) Notice: Subject to any disclaimer, the term of this patent is extended or adjusted under 35 U.S.C. 154(b) by 240 days.

(21) Appl. No.: 15/466,782

(22) Filed: Mar. 22, 2017

(65) Prior Publication Data

US 2017/0191545 A1 Jul. 6, 2017

Related U.S. Application Data

(63) Continuation of application No. PCT/JP2015/004448, filed on Sep. 1, 2015.

(30) Foreign Application Priority Data

Sep. 24, 2014 (JP) .................... 2014-193496

(51) Int. Cl.
*F16G 1/28* (2006.01)
*F16G 1/16* (2006.01)
*C08G 18/10* (2006.01)
*C08L 75/04* (2006.01)

(52) U.S. Cl.
CPC ............... *F16G 1/28* (2013.01); *C08G 18/10* (2013.01); *C08L 75/04* (2013.01); *F16G 1/16* (2013.01)

(58) Field of Classification Search
CPC ..... F16G 1/28; F16G 1/16; F16G 1/10; C08G 18/10; C08L 75/04
See application file for complete search history.

(56) References Cited

U.S. PATENT DOCUMENTS

| 4,632,665 | A | * | 12/1986 | Skura | F16G 1/28 474/205 |
|---|---|---|---|---|---|
| 4,895,555 | A | | 1/1990 | Watanabe et al. | |
| 4,963,308 | A | | 10/1990 | Watanabe et al. | |
| 5,536,214 | A | * | 7/1996 | Akita | B29D 29/08 474/268 |
| 5,807,194 | A | | 9/1998 | Knutson et al. | |
| 5,971,879 | A | * | 10/1999 | Westhoff | B32B 5/26 442/35 |
| 2006/0084543 | A1 | * | 4/2006 | Billups | F16G 1/28 474/237 |
| 2008/0004145 | A1 | * | 1/2008 | Duke | B29D 29/08 474/205 |
| 2010/0075793 | A1 | * | 3/2010 | Cretin | F16G 1/10 474/205 |

(Continued)

FOREIGN PATENT DOCUMENTS

| CA | 2231141 A1 | 10/1998 |
|---|---|---|
| JP | H05-62657 B2 | 9/1993 |
| JP | H11-166596 A | 6/1999 |

(Continued)

*Primary Examiner* — Michael R Mansen
*Assistant Examiner* — Robert T Reese
(74) *Attorney, Agent, or Firm* — Knobbe, Martens, Olson & Bear, LLP

(57) ABSTRACT

A toothed belt includes an uneven surface formed due to a weave pattern of a woven fabric or a knit loop pattern of a knitted fabric at a tooth bottom portion between toothed portions.

12 Claims, 8 Drawing Sheets

(56) References Cited

U.S. PATENT DOCUMENTS

2011/0003659 A1* 1/2011 Wu .................... D02G 3/32
474/250
2015/0285334 A1* 10/2015 Thomas .................... F16G 1/10
474/90

FOREIGN PATENT DOCUMENTS

| JP | 2954554 B2 | 7/1999 |
| --- | --- | --- |
| JP | 2965403 B2 | 8/1999 |
| JP | 2006-112574 A | 4/2006 |
| JP | 2010-96229 A | 4/2010 |
| JP | 2010-127442 A | 6/2010 |
| JP | 2014-167312 A | 9/2014 |

* cited by examiner

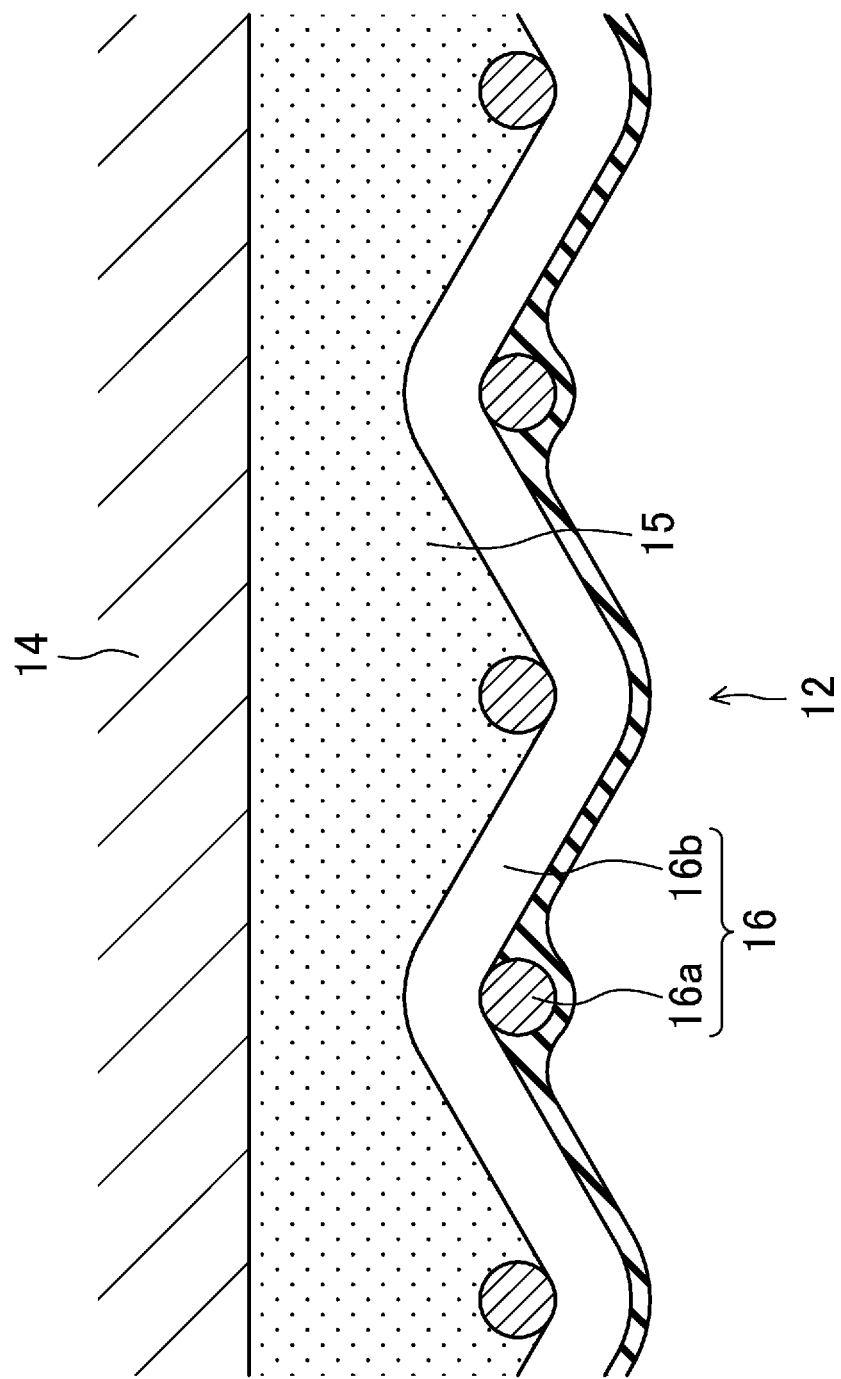

TOOTHED BELT

CROSS-REFERENCE TO RELATED APPLICATIONS

This is a continuation of International Application No. PCT/JP2015/004448 filed on Sep. 1, 2015, which claims priority to Japanese Patent Application No. 2014-193496 filed on Sep. 24, 2014. The entire disclosures of these applications are incorporated by reference herein.

BACKGROUND

The present invention relates to a toothed belt.

Toothed belts made of polyurethane resin are used for purposes of high torque power transmission in machinery, such as machine tools, printing machines, textile machines, and injection machines.

Patent Document 1 (Japanese Patent Publication No. H5-62657), Patent Document 2 (Japanese Patent No. 2965403), Patent Document 3 (Japanese Unexamined Patent Publication No. 2006-112574) and Patent Document 4 (Japanese Unexamined Patent Publication No. 2010-96229) disclose a toothed belt comprised of an endless toothed belt body made of polyurethane resin.

In the endless toothed belt body of the Patent Documents 1-4, a cord is buried so as to form a helical pattern having a pitch in the belt width direction, and a nonwoven fabric is buried so as to be located at a position that is closer to the inner circumference of the belt than the position where the cord is buried.

Patent Document 5 (Japanese Patent No. 2954554) discloses a toothed belt comprised of an endless toothed belt body made of polyurethane resin whose inner circumferential surface where toothed portions are provided is covered with canvas.

SUMMARY

The present invention is directed to a toothed belt including: an endless toothed belt body made of polyurethane resin and provided with a plurality of toothed portions spaced apart from one another on an inner circumference of the toothed belt body; a cord buried in the toothed belt body so as to lie along a belt length direction and form a helical pattern having a pitch in a belt width direction; a nonwoven fabric buried in the toothed belt body at a position that is closer to the inner circumference in a belt thickness direction than a position where the cord is buried, the nonwoven fabric filled with the polyurethane resin which forms the toothed belt body and lying along the belt length direction; and a woven fabric or a knitted fabric integrally disposed in the toothed belt body at a position that is closer to the inner circumference in the belt thickness direction than the position where the nonwoven fabric is buried, the woven fabric or the knitted fabric filled with the polyurethane resin which forms the toothed belt body and lying along the belt length direction. A tooth bottom portion between the toothed portions has an uneven surface formed due to a weave pattern of the woven fabric or a knit loop pattern of the knitted fabric.

BRIEF DESCRIPTION OF THE DRAWINGS

FIG. 2 illustrates an enlarged vertical cross-section of a tooth bottom portion.

DETAILED DESCRIPTION

Embodiments will be described in detail below based on the drawings.

First Embodiment

Figure 1:
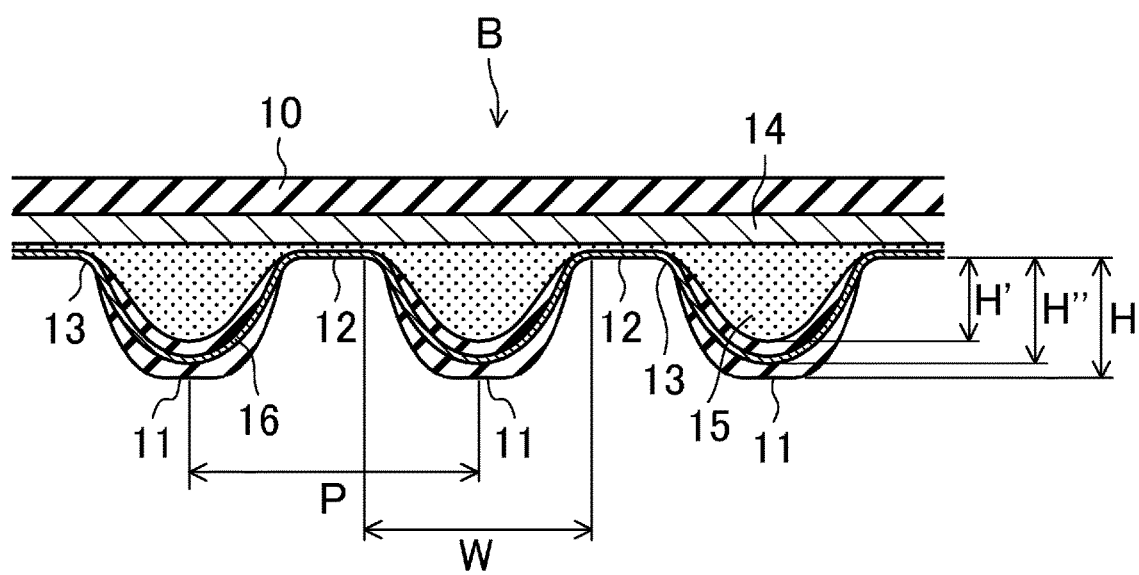
FIG. 1 illustrates a partial side view of a toothed belt according to a first embodiment.

FIG. 1 illustrates a toothed belt B of a first embodiment. The toothed belt B of the first embodiment is, for example, an endless engagement power transmission belt advantageously used for purposes of high torque power transmission in machinery, such as machine tools, printing machines, textile machines, and injection machines. The toothed belt B of the first embodiment has a length of 500 mm to 3000 mm, a width of 10 mm to 200 mm, and a thickness (a maximum thickness) of 3 mm to 20 mm.

The toothed belt B of the first embodiment includes an endless toothed belt body 10 made of polyurethane resin and having a wide-width flat strip part which is flat on the outer circumference of the belt. A plurality of toothed portions 11 are provided on the inner circumference of the flat strip part so as to be spaced from one another with predetermined pitches therebetween. A portion between the adjacent toothed portions 11 serves as a tooth bottom portion 12. A boundary portion between the toothed portion 11 and the tooth bottom portion 12 serves as a tooth root portion 13 recessed inward in the form an arc when viewed from the side. Note that a cog may be provided on the outer circumference of the belt.

Examples of the tooth profile of the toothed portion 11 in the side view include an arc tooth profile of the super torque synchronous (STS) belts in which both sides of the toothed portion are bowed outward in the form of an arc, a trapezoidal tooth profile, etc. The toothed portion 11 has, for example, 30 to 400 teeth, a width W (i.e., the dimension in the belt length direction) of 2 mm to 10 mm, a height H of 2 mm to 8 mm, and an arrangement pitch P of 5 mm to 20 mm.

The polyurethane resin which forms the toothed belt body 10 is obtained by adding a compounding agent, such as a curing agent and a plasticizer, into urethane prepolymer to prepare a urethane composition, and heating and pressurizing this urethane composition for curing.

Examples of the urethane prepolymer include such a urethane prepolymer whose isocyanate component is, e.g., tolylenediisocyanate (TDI) and diphenylmethane diisocyanate (MDI), and whose polyol component is, e.g., poly(tetramethylene ether) glycol (PTMG). The urethane prepolymer may be made of a single kind of urethane prepolymer, or a plurality of kinds of urethane prepolymer mixed together.

Examples of the curing agent include compounds of primary amines, secondary amines, and tertiary amines, such as 1,4-phenylenediamine, 2,6-diaminotoluene, 1,5-naphthalenediamine, 4,4'-diaminodiphenylmethane, 3,3'-dichloro-4,4'-diaminodiphenylmethane (MOCA), 3,3'-dimethyl-4,4'-diaminodiphenylmethane, 1-methyl-3,5-bis(methylthio)-2,6-diaminobenzene, 1-methyl-3,5'-diethyl-2,6-diaminobenzene, 4,4'-methylenebis(3-chloro-2,6-diethylaniline), 4,4'-methylenebis(ortho-chloroaniline), 4,4'-methylenebis(2,3-dichloroaniline), trimethylene glycol di-para-aminobenzoate, 4,4'-methylenebis(2,6-diethylaniline), 4,4'-methylenebis(2,6-diisopropylaniline), and 4,4'-diaminodiphenyl sulfone. The curing agent may be made of a single kind of curing agent, or a plurality of curing agents. The content of the curing agent in the urethane prepolymer in the case, for example, of an amine compound, is determined such that an α value ($NH_2/NCO$), which is a ratio between the molar number of $NH_2$ in the curing agent and the molar number of NCO in the urethane prepolymer, falls within a range of 0.70 to 1.10.

Examples of the plasticizer include dialkyl phthalate such as dibutylphthalate (DBP) and dioctyl phthalate (DOP), dialkyl adipate such as dioctyl adipate (DOA), dialkyl sebacate such as dioctyl sebacate (DOS), etc. The plasticizer may be made of a single kind of plasticizer, or may be made of a plurality of plasticizer. The content of the plasticizer with respect to 100 parts by mass of the urethane prepolymer is 3 to 20 parts by mass, for example.

Examples of other compounding agents include a coloring agent, an antifoaming agent, a stabilizer, etc.

Preferably, the physical properties (e.g., the hardness) of the polyurethane resin which forms the toothed belt body 10 is 70° to 100° in conformity with JIS K7312.

The toothed belt body 10 is provided with a cord 14 buried in the flat strip part thereof. The cord 14 extends along the belt length direction and forms a helical pattern having a pitch in the belt width direction. The cord 14 has a diameter of 0.2 mm to 5 mm and an arrangement pitch of 0.25 mm to 6 mm in the belt width direction, for example. Further, the pitch line differential (PLD) of the cord 14 is 0.2 mm to 5 mm, for example.

The cord 14 is made, for example, of single twist yarn, plied yarn, lang's lay, cored yarn, braids, etc. Note that if the cord 14 is made of twisted yarn, S-twist yarn whose second twist is S-twist and Z-twist yarn whose second twist is Z-twist may be alternately arranged in the belt width direction so as to form a double helical pattern.

Examples of fiber material which forms the cord 14 include inorganic fibers such as carbon fibers, glass fibers, and metal fibers, and organic fibers such as aramid fibers, polyester fibers, PBO fibers, nylon fibers, and polyketone fibers. The cord 14 may be made of a single kind of fibers, or a plurality of kinds of fibers. The cord 14 is preferably subjected to an adhesion treatment before the fabrication of the belt in which the cord is immersed, for example, in an epoxy adhesive and dried thereafter.

A nonwoven fabric 15 in the form of a flat strip is buried in the toothed belt body 10 at a position that is closer to the inner circumference of the belt in the belt thickness direction than the position where the cord 14 is buried, and lies along the belt length direction. The nonwoven fabric 15 may be made of a single layer, or a plurality of layers.

The nonwoven fabric 15 is filled with the polyurethane resin forming the toothed belt body 10, and forms a layer when viewed from the side. A portion of the nonwoven fabric 15 corresponding to the tooth bottom portion 12 is brought into contact with the cord 14 and is compressed in the belt thickness direction to have a reduced thickness. The thickness of the portion of the nonwoven fabric 15 corresponding to the tooth bottom portion 12 is, for example, 0.1 mm to 0.5 mm. A portion of the nonwoven fabric 15 corresponding to the toothed portion 11 enters into the toothed portion 11 and thus protrudes toward the toothed portion 11 in the belt thickness direction when viewed from the side, while being continuous with the portions corresponding to the toothed portions 11 on the lateral sides. The maximum thickness (i.e., an uncompressed thickness) of the portion of the nonwoven fabric 15 corresponding to the toothed portion 11 is, for example, 1.5 mm to 4.5 mm. Preferably, the portion of the nonwoven fabric 15 corresponding to the toothed portion 11 is protruded toward the toothed portion 11 to have a thickness that is preferably 50% or more and more preferably 70% or more on average of the height H of the toothed portion 11 in order to reinforce the toothed portion 11 ((H'/H)×100).

Preferably, the nonwoven fabric 15 has low density and is bulky for good immersion with the polyurethane resin. The basis weight of the nonwoven fabric 15 is preferably 200 $g/m^2$ to 600 $g/m^2$, and in particular, more preferably 230 $g/m^2$ to 300 $g/m^2$ if the arrangement pitch P of the toothed portions 11 is 8 mm or less and more preferably 390 $g/m^2$ to 500 $g/m^2$ if the arrangement pitch P of the toothed portions 11 is above 8 mm.

Examples of the fiber material which forms the nonwoven fabric 15 include nylon fibers, polyester fibers, aramid fibers, polyketone fibers, and carbon fibers. The nonwoven fabric 15 may be made of a single kind of fibers, or a plurality of kinds of fibers. The nonwoven fabric 15 may be subjected to an adhesion treatment before the fabrication of the belt in which the fabric is immersed, for example, in an epoxy adhesive and dried thereafter.

A woven fabric 16 is integrally disposed in the toothed belt body 10 at a position that is closer to the inner circumference of the belt in the belt thickness direction than the position where the nonwoven fabric 15 is buried, and lies along the belt length direction. The woven fabric 16 may be made of a single layer, or a plurality of layers.

The woven fabric 16 is filled with the polyurethane resin forming the toothed belt body 10, and forms a layer when viewed from the side.

A portion of the woven fabric 16 corresponding to the tooth bottom portion 12 is brought into contact with the nonwoven fabric 15 and is compressed in the belt thickness direction. The thickness of the portion of the woven fabric 16 corresponding to the tooth bottom portion 12 is, for example, 0.1 mm to 0.5 mm. The portion of the woven fabric 16 corresponding to the tooth bottom portion 12 is filled with the polyurethane resin, but with reduced degree of immersion due to the presence of the nonwoven fabric 15. As a result, as illustrated in FIG. 2, the tooth bottom portion 12 has an uneven surface formed due to the weave pattern of the woven fabric 16. The woven fabric 16 may be exposed on the surface of the tooth bottom portion 12, or may be buried in a surface layer of the tooth bottom portion 12.

In the known toothed belts made of polyurethane resin, regardless of whether they have a configuration disclosed in Patent Documents 1-4, in which a nonwoven fabric is buried in a toothed belt body, or a configuration disclosed in Patent Document 5, in which canvas covers the inner circumferential surface of the toothed belt body where the toothed portions are formed, the nonwoven fabric or the canvas is soaked with uncured polyurethane resin at the tooth bottom portion between the toothed portions in the fabrication of the belt, and the uncured polyurethane resin exudes to the tooth bottom portion. As a result, the nonwoven fabric or the canvas is buried in the surface layer of the toothed belt body, which leads to exposure of hard polyurethane resin on the surface. This may result in generation of big noise during running of the belt, due to superimposition of the hitting sound of the hard tooth bottom portion making contact with the pulley on the hitting sound of the hard toothed portion making contact with the pulley. It is conceivable to cover the area provided with the toothed belt in order to prevent leakage of the noise. In that case, however, the increase in the temperature of the belt causes degradation of the polyurethane resin forming the toothed belt body, which may shorten the life of the belt.

On the other hand, according to the toothed belt B of the first embodiment, the tooth bottom portion 12 has the uneven surface formed due to the weave pattern of the woven fabric 16. This uneven surface of the tooth bottom portion 12 serves as a cushion, and may reduce the hitting sound of the tooth bottom portion 12 making contact with the pulley. This uneven surface of the tooth bottom portion 12 may also reduce the resonance (i.e., the column resonance) generated between the toothed belt B and a pulley when the toothed portions 11 engage with the pulley. Even if a very high tension in a range from 49 N to 294 N is applied to the cord 14 in winding the cord 14 during the fabrication of the belt, which will be described later, in order to reduce the degree of untwisting of the cord 14 and the degree of stretch of the cord 14 at initial stage of the belt running, the nonwoven fabric 15 disposed between the cord 14 and the woven fabric 16 reduces the degree of compression by the cord 14 and therefore protects the projections and recesses of the woven fabric 16 from becoming flat. Thus, the hitting sound of the tooth bottom portion 12 making contact with the pulley and the resonance generated when the toothed portions 11 engage with the pulley may be advantageously reduced, while reducing the degree of untwisting of the cord 14 and the degree of stretch of the cord 14 at initial stage of the belt running.

The arithmetic mean roughness (Ra) of the uneven surface of the tooth bottom portion 12 is preferably 5 μm to 25 μm and more preferably 10 μm to 25 μm. The size (i.e., the maximum diameter) of each of the projections and recesses of the uneven surface in plan view is preferably 0.3 mm to 1.2 mm and more preferably 0.5 mm to 1.0 mm. The arithmetic mean roughness (Ra) used herein is a value measured based on JIS B0601.

The portion of the woven fabric 16 corresponding to the toothed portion 11 follows the profile of the nonwoven fabric 15 when viewed from the side, while being continuous with the portions corresponding to the toothed portions 11 on the lateral sides. The uncompressed thickness of the portion of the woven fabric 16 corresponding to the toothed portion 11 is, for example, 1.6 mm to 4.6 mm. Preferably, the portion of the woven fabric 16 corresponding to the toothed portion 11 is not in contact with the nonwoven fabric 15, that is, there is a polyurethane resin layer between the portion of the woven fabric 16 corresponding to the toothed portion 11 and the nonwoven fabric 15. It is also preferable if the portion of the woven fabric 16 corresponding to the toothed portion 11 is not exposed on the surface of the toothed portion 11, but is buried in the toothed portion 11. Preferably, the portion of the woven fabric 16 corresponding to the toothed portion 11 has a distal end closest to the toothed portion 11 at a position that is preferably 60% or more and more preferably 80% or more on average of the height H of the toothed portion in order to reinforce the toothed portion 11 (($H''/H$)×100).

Figure 3A:
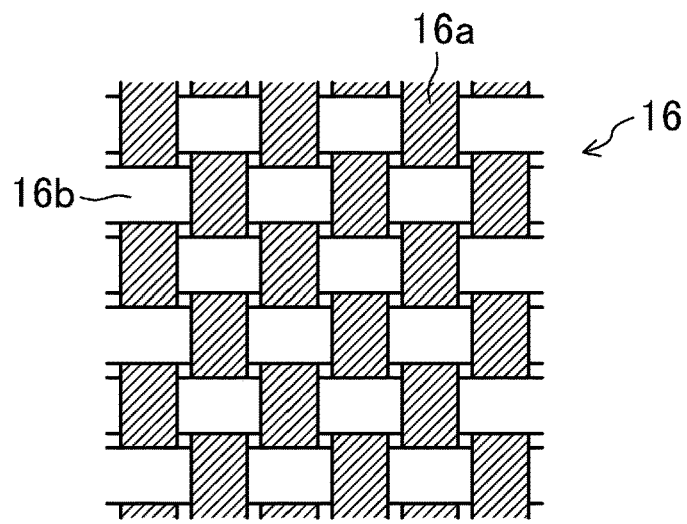
FIG. 3A illustrates a plan view of a weave structure of a plain weave fabric.
Figure 3B:
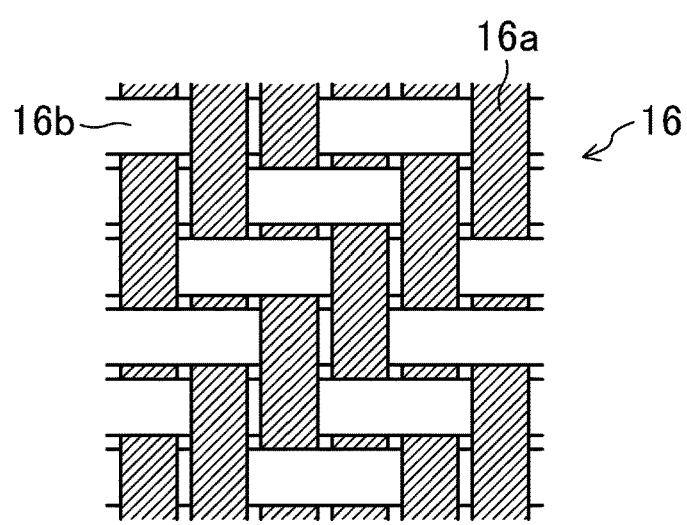
FIG. 3B illustrates a plan view of a weave structure of a twill weave fabric.
Figure 3C:
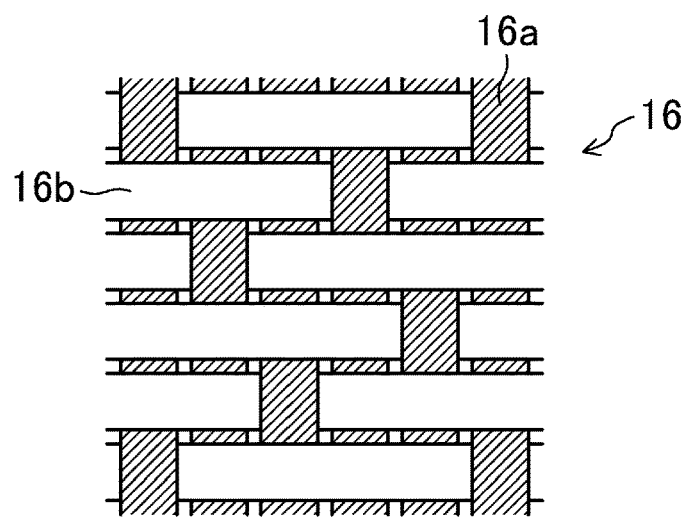
FIG. 3C illustrates a plan view of a weave structure of a satin weave fabric.

The woven fabric 16 is made of warp yarn 16a and weft yarn 16b woven, for example, into a plain weave fabric as illustrated in FIG. 3A, a twill weave fabric (i.e., a herringbone woven fabric) as illustrated in FIG. 3B, and a satin weave fabric as illustrated in FIG. 3C. The fineness of the warp yarn 16a and the weft yarn 16b is preferably 44 dtex to 933 dtex and more preferably 44 dtex to 235 dtex. The yarn density of the warp yarn 16a and the weft yarn 16b is preferably 74 to 430 lengths of yarn per five-centimeter width of the woven fabric 16 and more preferably 132 to 174 lengths of yarn per five-centimeter width of the woven fabric 16. The basis weight of the woven fabric 16 is preferably 90 $g/m^2$ to 600 $g/m^2$ and more preferably 200 $g/m^2$ to 350 $g/m^2$. The basis weight of the woven fabric 16 is preferably 30% to 170%, more preferably 70% to 130%, and still more preferably 100% of the basis weight of the nonwoven fabric 15 in order to reinforce the toothed portions 11 and the tooth root portions 13. In other words, it is particularly preferable if the basis weight of the woven fabric 16 is equal to the basis weight of the nonwoven fabric 15.

Preferably, the woven fabric 16 is provided such that the warp yarn 16a or the weft yarn 16b aligns with the belt length direction, for example. If stretch textured yarn, such as false-twist textured yarn, is used as the weft yarn 16b, the woven fabric 16 has anisotropic stretch properties. In such a case, the weft yarn 16b preferably aligns with the belt length direction to increase the stretch properties of the woven fabric 16 in the belt length direction.

Examples of the fiber material which forms the woven fabric 16 include nylon fibers such as nylon 6,6 fibers, nylon 4,6, and nylon 6, chemical fibers such as polyketone fibers, aramid fibers, and polyester fibers, and natural fibers such as cotton. The woven fabric 16 may be made of a single kind of fibers, or a plurality of kinds of fibers. The fiber material of the woven fabric 16 is preferably the same as the fiber material of the nonwoven fabric 15 in order to reinforce the toothed portions 11 and the tooth root portions 13. The woven fabric 16 may be subjected to an adhesion treatment before the fabrication of the belt in which the woven fabric 16 is immersed, for example, in an epoxy adhesive and dried thereafter.

In the toothed belt B of the first embodiment having the above configuration, the nonwoven fabric 15 filled with the polyurethane resin increases the elasticity of a wide area of the tooth root portion 13 itself, and the woven fabric 16 may reduce the possibility of formation and progress of cracks on or near the surface of the tooth root portion 13. This means that the layered structure of the nonwoven fabric 15 and the woven fabric 16 reinforces the tooth root portion 13, and therefore may lead to a significant improvement in preventing chipping of the teeth.

The toothed belt B of the first embodiment is looped, for example, over a pair of pulleys to transmit power from a driving source to the driven pulley The outer diameter of each of the pulleys is 20 mm to 700 mm, for example. In addition, the belt running speed is, for example, 10 m/min to 2000 m/min, and the transfer capacity is, for example, 0.1 KW to 600 KW.

Now, a fabrication method of the toothed belt B of the first embodiment will be described.

Figure 4A:
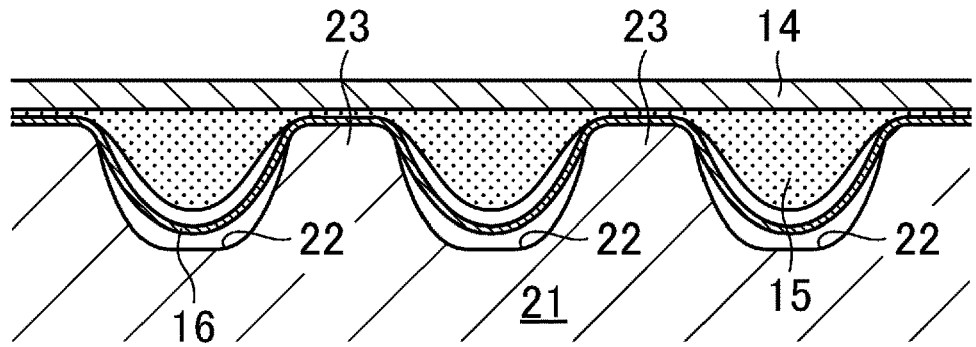
FIG. 4A is a first diagram for explaining a fabrication method of the toothed belt of the first embodiment.

First, as illustrated in FIG. 4A, a columnar inner mold 21 is covered with the woven fabric 16 and then with the nonwoven fabric 15 which are formed into a cylindrical shape. The cord 14 is then helically wound around this inner mold 21. The inner mold 21 is provided with grooves 22 in its outer surface. The grooves 22, each having a cross section corresponding to the shape of the toothed portion 11, extend in the axial direction of the mold, and are spaced from one another with a certain pitch therebetween in the circumferential direction. Preferably, the woven fabric 16 has a length longer than the circumference of the inner mold 21 so that the woven fabric 16 is curved and enters into each groove 22. Preferably, the nonwoven fabric 15 has a length which makes the nonwoven fabric 15 slightly tensioned in the circumferential direction when placed on the woven fabric 16.

Figure 4B:
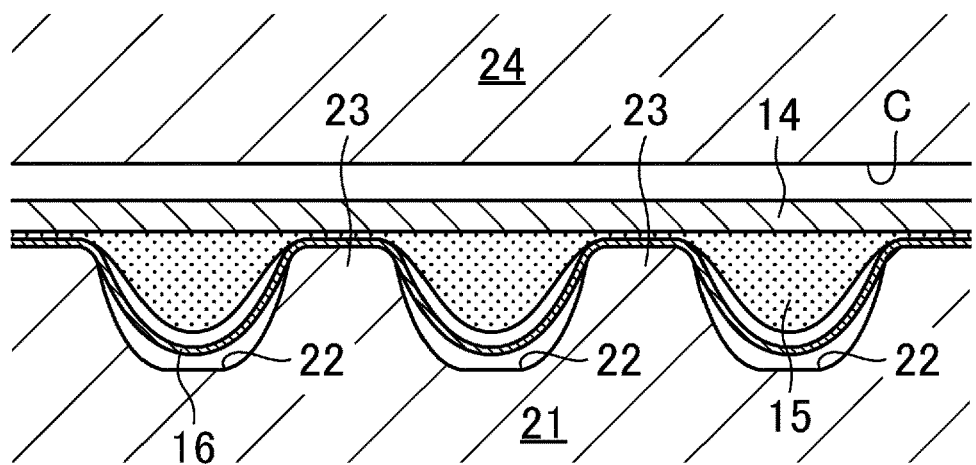
FIG. 4B is a second diagram for explaining the fabrication method of the toothed belt of the first embodiment.

Next, as illustrated in FIG. 4B, the inner mold 21 is placed in a cylindrical outer mold 24. In this state, there is formed a cavity C for forming the toothed belt body between the inner mold 21 and the outer mold 24.

Figure 4C:
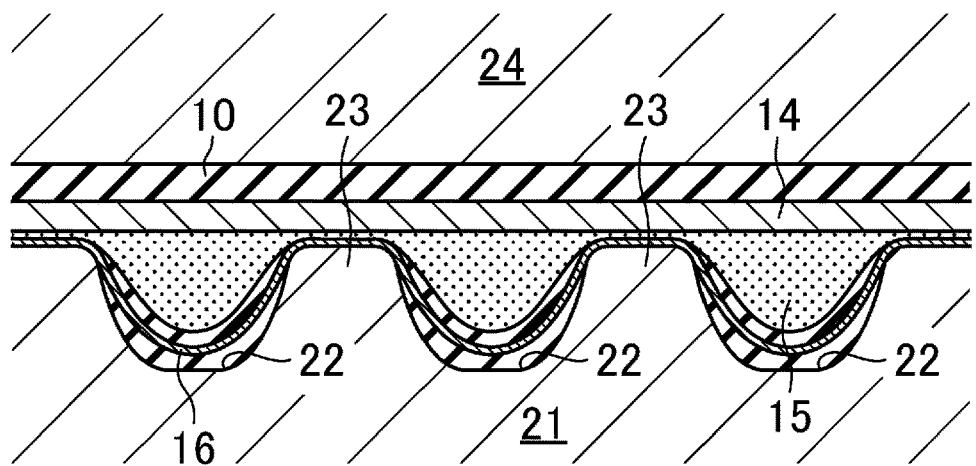
FIG. 4C is a third diagram for explaining the fabrication method of the toothed belt of the first embodiment.

Next, as illustrated in FIG. 4C, the cavity C is sealed, and a urethane composition obtained by adding a compounding agent to urethane prepolymer is injected to fill the sealed cavity C and is heated. Meanwhile, the urethane composition flows and is cured, and the toothed portions 11 are formed by the grooves 22 and the tooth bottom portions 12 are formed by ridges 23. The toothed belt body 10 is obtained in this manner. Further, since the nonwoven fabric 15 is soaked with the urethane composition, and the urethane composition is cured, the nonwoven fabric 15 is filled with the polyurethane resin, is buried in the toothed belt body 10, and lies along the belt length direction. Moreover, since the urethane composition enters into the woven fabric 16 and is cured, the woven fabric 16 is filled with the polyurethane resin, is integrally disposed in the toothed belt body 10, and lies along the belt length direction. The woven fabric 16 at the tooth bottom portion 12 is filled with the polyurethane resin, but with reduced degree of immersion due to the presence of the nonwoven fabric 15. As a result, the uneven surface is obtained due to the weave pattern of the woven fabric 16. In this manner, the toothed belt body 10, the cord 14, the nonwoven fabric 15, and the woven fabric 16 are combined together, thereby forming a cylindrical slab. The slab is formed under the conditions, for example, of a temperature of 70° C. to 130° C. and time of 10 to 120 minutes.

Lastly, the slab is removed from the inner mold 21 and the outer mold 24 and is cut into rings to obtain the toothed belts B of the first embodiment.

Second Embodiment

A toothed belt B of the second embodiment and a fabrication method of the toothed belt B have the same appearances as those described in the first embodiment which are shown in FIGS. 1 and 4. In the following description, the toothed belt B of the second embodiment and the fabrication method thereof will be described with reference to FIGS. 1 and 4 of the first embodiment, as well. In these drawings, the reference character 16 is interpreted as indicating a knitted fabric.

As illustrated in FIG. 1, the toothed belt B of the second embodiment includes a knitted fabric 16 integrally disposed in the toothed belt body 10 at a position that is closer to the inner circumference of the belt in the belt thickness direction than the position where the nonwoven fabric 15 is buried, and lies along the belt length direction. The knitted fabric 16 may be made of a single layer, or a plurality of layers.

The knitted fabric 16 is filled with the polyurethane resin forming the toothed belt body 10, and forms a layer when viewed from the side.

A portion of the knitted fabric 16 corresponding to the tooth bottom portion 12 is brought into contact with the nonwoven fabric 15 and is compressed in the belt thickness direction. The thickness of the portion of the knitted fabric 16 corresponding to the tooth bottom portion 12 is, for example, 0.1 mm to 0.5 mm. The portion of the knitted fabric 16 corresponding to the tooth bottom portion 12 is filled with the polyurethane resin, but with reduced degree of immersion due to the presence of the nonwoven fabric 15. As a result, the tooth bottom portion 12 has an uneven surface formed due to a knit loop pattern of the knitted fabric 16. The knitted fabric 16 may be exposed on the surface of the tooth bottom portion 12, or may be buried in a surface layer of the tooth bottom portion 12.

According to the toothed belt B of the second embodiment, the tooth bottom portion 12 has the uneven surface formed due to the knit loop pattern of the knitted fabric 16. This uneven surface of the tooth bottom portion 12 serves as a cushion, and may reduce the hitting sound of the tooth bottom portion 12 making contact with the pulley. This uneven surface of the tooth bottom portion 12 may also reduce the resonance (i.e., the column resonance) generated between the toothed belt B and a pulley when the toothed portions 11 engage with the pulley. Even if a very high tension of 49 N to 294 N is applied to the cord 14 in winding the cord 14 during the fabrication of the belt, which will be described later, in order to reduce the degree of untwisting of the cord 14 and the degree of stretch of the cord 14 at initial stage of the belt running, the nonwoven fabric 15 disposed between the cord 14 and the knitted fabric 16 reduces the degree of compression by the cord 14 and therefore protects the projections and recesses of the knitted fabric 16 from becoming flat. Thus, the hitting sound of the tooth bottom portion 12 making contact with the pulley and the resonance generated when the toothed portions 11 engage with the pulley may be advantageously reduced, while reducing the degree of untwisting of the cord 14 and the degree of stretch of the cord 14 at initial stage of the belt running.

The arithmetic mean roughness (Ra) of the uneven surface of the tooth bottom portion 12 is preferably 5 μm to 25 μm and more preferably 10 μm to 25 μm. The size (i.e., the maximum diameter) of each of the projections and recesses of the uneven surface in plan view is preferably 0.3 mm to 1.2 mm and more preferably 0.5 mm to 1.0 mm.

A portion of the knitted fabric 16 corresponding to the toothed portion 11 follows the profile of the nonwoven fabric 15 when viewed from the side, while being continuous with the portions corresponding to the toothed portions 11 on its lateral sides. The uncompressed thickness of the portion of the knitted fabric 16 corresponding to the toothed portion 11 is, for example, 1.6 mm to 4.6 mm. Preferably, the portion of the knitted fabric 16 corresponding to the toothed portion 11 is not in contact with the nonwoven fabric 15, that is, there is a polyurethane resin layer between the portion of the knitted fabric 16 corresponding to the toothed portion 11 and the nonwoven fabric 15. It is also preferable if the portion of the knitted fabric 16 corresponding to the toothed portion 11 is not exposed on the surface of the toothed portion 11, but is buried in the toothed portion 11. Preferably, the portion of the knitted fabric 16 corresponding to the toothed portion 11 has a distal end closest to the toothed portion 11 at a position that is preferably 60% or more and more preferably 80% or more on average of the height H of the toothed portion in order to reinforce the toothed portion 11((H"/H)×100).

Figure 5A:
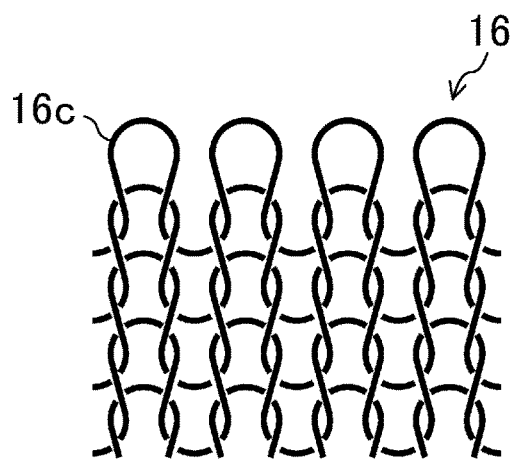
FIG. 5A illustrates a plan view of a plain knitted fabric.
Figure 5B:
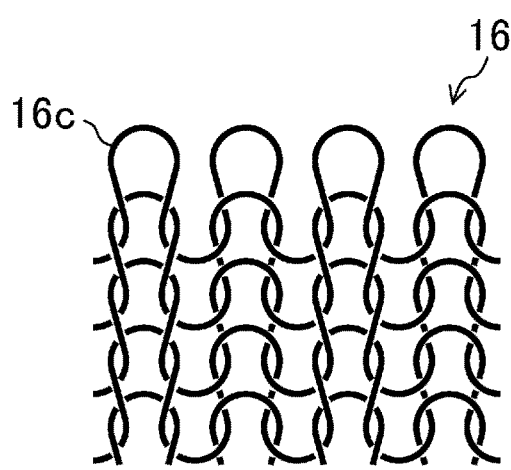
FIG. 5B illustrates a plan view of a rib knitted fabric.
Figure 5C:
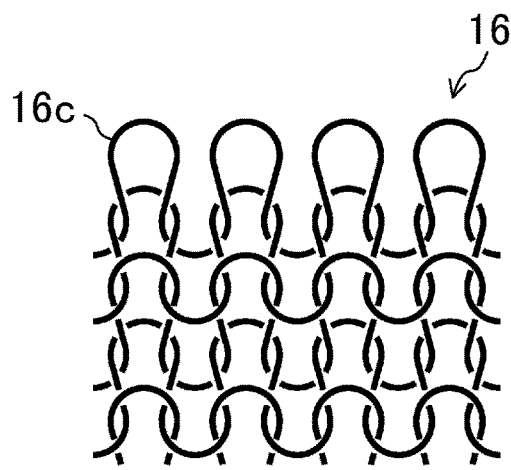
FIG. 5C illustrates a plan view of a purl knitted fabric.

The knitted fabric 16 is made of knitting yarn 16c knitted, for example, into a plain knitted fabric as illustrated in FIG. 5A, a rib knitted fabric as illustrated in FIG. 5B, and a purl knitted fabric as illustrated in FIG. 5C. The fineness of the knitting yarn 16c is preferably 10 dtex to 1000 dtex and more preferably 50 dtex to 300 dtex. The density of the knit loops in the wale direction is preferably 5 to 100 knit loops per 2.54-centimeter width and more preferably 20 to 40 knit loops per 2.54-centimeter width. The density of the knit loops in the course direction is preferably 5 to 100 knit loops per 2.54-centimeter width and more preferably 15 to 35 knit loops per 2.54-centimeter width. The basis weight of the knitted fabric 16 is preferably 50 g/m$^2$ to 600 g/m$^2$ and more preferably 100 g/m$^2$ to 400 g/m$^2$. The basis weight of the knitted fabric 16 is preferably 30% to 170%, more preferably 70% to 130%, and still more preferably 100% of the basis weight of the nonwoven fabric 15 in order to reinforce the toothed portions 11 and the tooth root portions 13. In other words, it is particularly preferable if the basis weight of the knitted fabric 16 is equal to the basis weight of the nonwoven fabric 15.

The knitted fabric 16 is more stretchable in the course direction than in the wale direction. That is, the knitted fabric 16 has anisotropic stretch properties. It is thus preferable if the knitted fabric 16 is arranged such that its course direction aligns with the belt length direction in order that the knitted fabric 16 is more stretchable in the belt length direction.

Examples of the fiber material which forms the knitted fabric 16 include nylon fibers such as nylon 6,6 fibers, nylon 4,6, and nylon 6, polyketone fibers, aramid fibers, and polyester fibers. The knitted fabric 16 may be made of a single kind of fibers, or a plurality of kinds of fibers. The fiber material of the knitted fabric 16 is preferably the same as the fiber material of the nonwoven fabric 15 in order to reinforce the toothed portions 11 and the tooth root portions 13. The knitted fabric 16 may be subjected to an adhesion treatment before the fabrication of the belt in which the knitted fabric 16 is immersed, for example, in an epoxy adhesive and dried thereafter.

In the toothed belt B of the second embodiment having the above configuration, the nonwoven fabric 15 filled with the polyurethane resin increases the elasticity of a wide area of the tooth root portion 13 itself, and the knitted fabric 16 may reduce the possibility of formation and progress of cracks on or near the surface of the tooth root portion 13. This means that the layered structure of the nonwoven fabric 15 and the knitted fabric 16 reinforces the tooth root portion 13, and therefore may lead to a significant improvement in preventing chipping of the belt.

Now, a fabrication method of the toothed belt B of the second embodiment will be described.

First, as illustrated in FIG. 4A, a columnar inner mold 21 is covered with the knitted fabric 16 and then with the nonwoven fabric 15 which are formed into a cylindrical shape. The cord 14 is then helically wound around this inner mold 21. The inner mold 21 is provided with grooves 22 in its outer surface. The grooves 22, each having a cross section corresponding to the shape of the toothed portion 11, extend in the axial direction of the mold, and are spaced from one another with a certain pitch therebetween in the circumferential direction. Preferably, the knitted fabric 16 has a length longer than the circumference of the inner mold 21 so that the knitted fabric 16 is curved and enters into each groove 22. Preferably, the nonwoven fabric 15 has a length which makes the nonwoven fabric 15 slightly tensioned in the circumferential direction when placed on the knitted fabric 16, slightly applies tension to. The tension to be applied to the cord 14 in winding the cord 14 is, for example, 49 N to 294 N.

Next, as illustrated in FIG. 4B, the inner mold 21 is placed in a cylindrical outer mold 24. In this state, there is formed a cavity C for forming the toothed belt body between the inner mold 21 and the outer mold 24.

Next, as illustrated in FIG. 4C, the cavity C is sealed, and a urethane composition obtained by adding a compounding agent to urethane prepolymer is injected to fill the sealed cavity C and is heated. Meanwhile, the urethane composition flows and is cured, and the toothed portions 11 are formed by the grooves 22 and the tooth bottom portions 12 are formed by ridges 23. The toothed belt body 10 is obtained in this manner. Further, since the nonwoven fabric 15 is soaked with the urethane composition, and the urethane composition is cured, the nonwoven fabric 15 is filled with the polyurethane resin, is buried in the toothed belt body 10, and lies along the belt length direction. Moreover, since the urethane composition enters into the knitted fabric 16 and is cured, the knitted fabric 16 is filled with the polyurethane resin, is integrally disposed in the toothed belt body 10, and lies along the belt length direction. The knitted fabric 16 at the tooth bottom portion 12 is filled with the polyurethane resin, but with reduced degree of immersion due to the presence of the nonwoven fabric 15. As a result, the uneven surface is obtained due to the knit loop pattern of the knitted fabric 16. In this manner, the toothed belt body 10, the cord 14, the nonwoven fabric 15, and the knitted fabric 16 are combined together, thereby forming a cylindrical slab. The slab is formed under the conditions, for example, of a temperature of 70° C. to 130° C. and time of 10 to 120 minutes.

Lastly, the slab is removed from the inner mold 21 and the outer mold 24 and is cut into rings to obtain the toothed belts B of the second embodiment.

The other configurations are the same as those in the first embodiment.

EXAMPLES

Toothed Belt

Example

Toothed belts whose tooth profile has similar configurations to those of the first embodiment (i.e., the tooth profile of STS belts) were prepared as Example.

As the toothed belts of Example, two types of belts were prepared each of which has a length of 1200 mm and a maximum thickness of 4.8 mm, and a width of 10 mm for one type and a width of 15 mm for the other type. The toothed portion of each belt has 150 teeth, each having a width W of 5.2 mm and a height H of 2.85 mm. The teeth are arranged with an arrangement pitch P of 8.0 mm.

The urethane composition forming the toothed belt body was prepared by adding, into 100 parts by mass of urethane prepolymer (manufactured by Mitsui Chemicals & SKC Polyurethanes Inc., product name: HIPRENE L-100), 13 parts by mass of 3,3'-dichloro-4,4'-diaminodiphenylmethane (manufactured by IHARA CHEMICAL INDUSTRY CO., LTD., product name: IHARACUAMINE-MT) as a curing agent and 10 parts by mass of dioctyl phthalate (manufactured by CHISSO CORPORATION, product name: DOP) as a plasticizer. The hardness of the polyurethane resin forming the toothed belt body was 92° which was measured based on JIS K7312.

Two types of plied yarns (1270 dtex/4×5), i.e., S-twist yarn and Z-twist yarn made of aramid fibers, were used as the cord and were alternately arranged in the belt width direction so as to form a double helical pattern. The cord was subjected to an adhesion treatment in which the cord was immersed in an epoxy adhesive and dried thereafter. The tension applied to the cord in winding the cord was determined to be 98.1 N. The cord had a diameter of 0.90 mm and an arrangement pitch of 1.5 mm in the belt width direction. The PLD was 0.8 mm.

The nonwoven fabric used was made of nylon fibers and obtained through needle punching with no pressure applied to it. No adhesion treatment was carried out on the nonwoven fabric. The nonwoven fabric had a thickness of 5.4 mm and a basis weight of 250 g/m$^2$. A portion of the nonwoven fabric corresponding to the toothed portion was protruded toward the toothed portion to have a thickness that is 70% on average of the height H of the toothed portion ((H'/H)× 100).

The woven fabric used was a twill weave fabric made of warp yarn and weft yarn of nylon fibers whose fineness was 235 dtex. The woven fabric was placed such that the weft yarn aligned with the belt length direction. Thus, the fiber material of the woven fabric was the same as the fiber material of the nonwoven fabric. No adhesion treatment was carried out on the woven fabric. The woven fabric had a thickness of 0.6 mm and a basis weight of 250 g/m$^2$. The yarn density of the warp yarn and the weft yarn was 200 lengths per 5-centimeter width. Thus, the basis weight of the woven fabric was the same as the basis weight of the nonwoven fabric. A portion of the woven fabric corresponding to the toothed portion has a distal end closest to the toothed portion at a position that is 80% on average of the height H of the toothed portion ((H''/H)×100). That is, the portion of the woven fabric corresponding to the toothed portion was not in contact with the nonwoven fabric, and was buried in the toothed portion without being exposed on the surface of the toothed portion. The tooth bottom portion had an uneven surface formed due to the weave pattern of the woven fabric. The uneven surface had an arithmetic mean roughness (Ra) of 18.2 µm.

Comparative Example 1

Figure 6A:
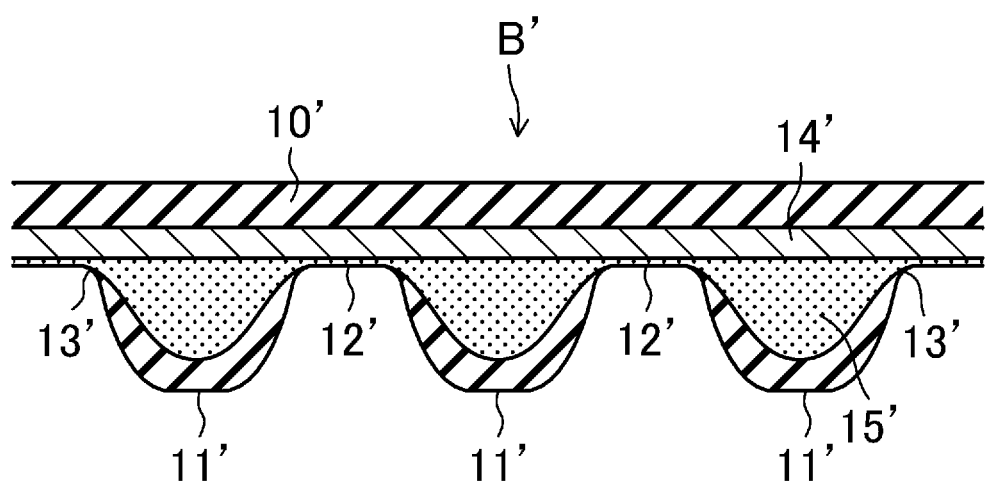
FIG. 6A illustrates a partial side view of a toothed belt of Comparative Example 1.

As illustrated in FIG. 6A, a toothed belt B' having the same configuration as that of Example except that the toothed belt B' does not have a woven fabric was prepared as Comparative Example 1. In the toothed belt B' of Comparative Example 1, polyurethane resin is exposed on a surface of a tooth bottom portion 12'. This surface has an arithmetic mean roughness (Ra) of 2.6 µm. Note that the toothed belt of Comparative Example 1 corresponds to the toothed belts disclosed in Patent Documents 1 to 4.

Comparative Example 2

Figure 6B:
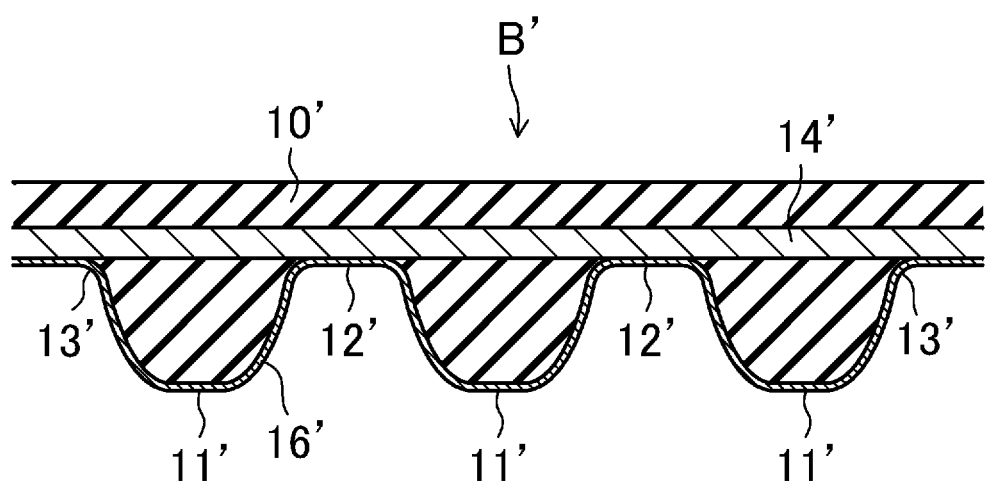
FIG. 6B illustrates a partial side view of a toothed belt of Comparative Example 2.

As illustrated in FIG. 6B, a toothed belt B' having the same configuration as that of Example except that the toothed belt B' does not have a nonwoven fabric and that a woven fabric 16' is disposed so as to cover the inner circumferential surface of the toothed belt body 10' where the toothed portions 11' are formed, was prepared as the Comparative Example 2. In the toothed belt of Comparative Example 2, polyurethane resin is exposed on a surface of a tooth bottom portion 12'. This surface has an arithmetic mean roughness (Ra) of 1.8 µm. Note that the toothed belt of Comparative Example 2 corresponds to the toothed belt disclosed in Patent Document 5.

(Evaluation Test Method)

<Noise Test>

Figure 7A:
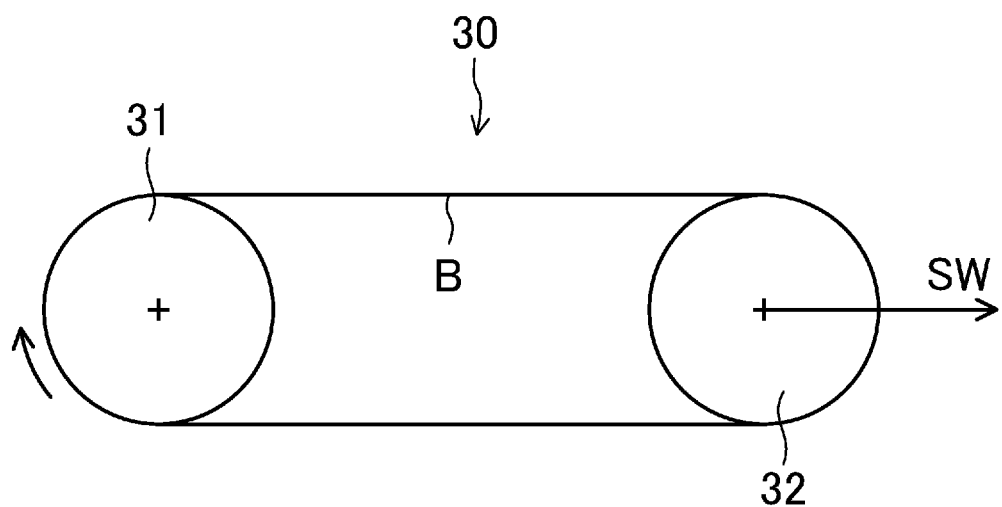
FIG. 7A illustrates a layout of pulleys of a belt running test machine for noise test.

FIG. 7A illustrates a pulley layout 30 of a belt running test machine for noise test.

The belt running test machine 30 includes a drive pulley 31 and a driven pulley 32 each having 24 teeth and an outer diameter of 59.74 mm. The drive pulley 31 and the driven pulley 32 are arranged so as to be laterally spaced from each other. The machine is configured such that an axial load (SW) in the lateral direction may be applied to the driven pulley 32.

The toothed belts of Example and Comparative Examples 1 and 2 were prepared to have a width of 30 mm. These toothed belts were looped over the drive pulley 31 and the driven pulley 32 of the belt running test machine 30, and an axial load (SW) of 1000N was applied to the driven pulley 32. The number of rotations of the drive pulley 31 was increased from 0 rpm to 5000 rpm in three minutes under a normal temperature in order to run the belt and measure the noise level (dB(A)) while the number of rotations was from 500 rpm to 3500 rpm by means of a noise measuring device. The same measurement was conducted for the cases in which the axial load (SW) was set to be 1250 N and to be 1500N. A mean value of the noise levels while the number of rotations was in the range of 1000 rpm to 5000 rpm was obtained from the results of the measurement. The number of rotations was determined to be 1000 rpm or more, since the measurement is affected more by resonance of the machine if the number of rotations is less than 1000 rpm.

<Durability Test>

Figure 7B:
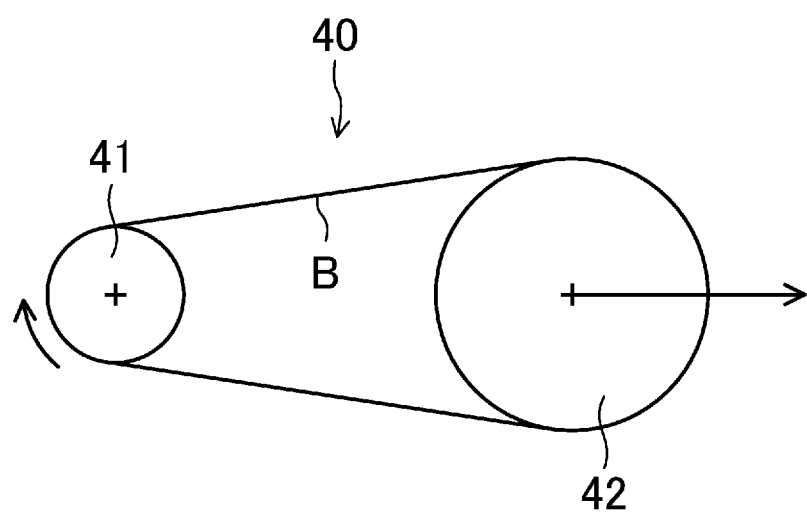
FIG. 7B illustrates a layout of pulleys of a belt running test machine for durability test.

FIG. 7B illustrates a pulley layout 40 of a belt running test machine for durability test.

The belt running test machine 40 includes a drive pulley 41 having 20 teeth and an outer diameter of 49.56 mm, and a driven pulley 42 having 40 teeth and an outer diameter of 100.49 mm. The drive pulley 41 and the driven pulley 42 are arranged so as to be laterally spaced from each other. The machine is configured such that an axial load (SW) in the lateral direction may be applied to the driven pulley 42.

The toothed belts of Example and Comparative Examples 1 and 2 were prepared to have a width of 10 mm. These toothed belts were looped over the drive pulley 41 and the driven pulley 42 of the belt running test machine 40, and an axial load (SW) of 392 N and torque of 50 N·m were applied to the driven pulley 42. The drive pulley 41 was rotated at 7000 rpm under a normal temperature to run the belt. The belt was kept running and periodically stopped for a visual check until breakdown such as chipping or wear of the toothed portion occurs.

Further, different toothed belts were kept running for 500 hours. Test pieces in a narrow rectangular shape for tensile test were prepared from those toothed belts, and the strength of each test piece was measured. The measured strength was divided by the number of cords, thereby obtaining the strength per cord. This strength per cord was further divided by the strength per cord of the unused toothed belt, thereby obtaining a strength retention rate.

(Evaluation Test Results)

Figure 8:
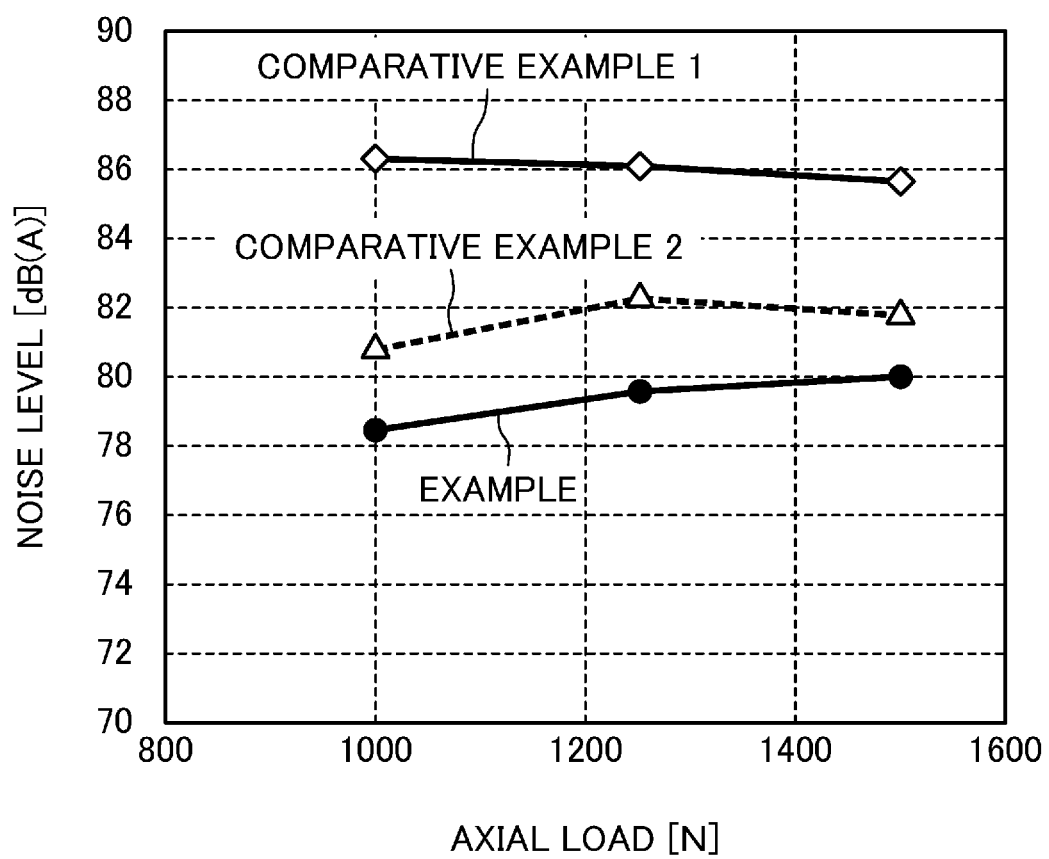
FIG. 8 is a graph showing a relationship between an axial load and noise level.

Table 1 and FIG. 8 show the results of the noise test.

TABLE 1

|  |  | Example | Comparative Example 1 | Comparative Example 2 |
|---|---|---|---|---|
| Axial Load | 1000 N | 78.4 dB (A) | 86.3 dB (A) | 80.9 dB (A) |
|  | 1250 N | 79.6 dB (A) | 86.1 dB (A) | 82.4 dB (A) |
|  | 1500 N | 80.1 dB (A) | 85.7 dB (A) | 81.9 dB (A) |

Motor Sound: 65.2 dB (A)

Table 1 and FIG. 8 show that the noise level of Example is lower than the noise levels of the Comparative Examples 1 and 2.

Table 2 shows the results of the durability test.

TABLE 2

|  | Example | Comparative Example 1 | Comparative Example 2 |
|---|---|---|---|
| Running Hours Before Breakdown | 2500 hours | 1050 hours | 850 hours |
| Breakdown Mode | Wear of Toothed Portion | Chipping of Toothed Portion | Chipping of Toothed Portion |
| Strength Retention Rate After 500-Hour Belt Running | 85% | 80% | 80% |

Table 2 shows that the belt of Example is more durable than the belts of Comparative Examples 1 and 2.

The present invention is useful in the technical field of toothed belts.

The embodiment has been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiment described above is intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A toothed belt comprising:
    an endless toothed belt body made of polyurethane resin and provided, on its inner circumference, with a plurality of toothed portions spaced apart from one another;
    a cord buried in the toothed belt body so as to lie along a belt length direction and form a helical pattern having a pitch in a belt width direction;
    a nonwoven fabric buried in the toothed belt body at a position that is closer to the inner circumference in a belt thickness direction than a position where the cord is buried, the nonwoven fabric filled with the polyurethane resin which forms the toothed belt body and lying along the belt length direction; and
    a woven fabric or a knitted fabric integrally disposed in the toothed belt body at a position that is closer to the inner circumference in the belt thickness direction than the position where the nonwoven fabric is buried, the woven fabric or the knitted fabric filled with the polyurethane resin which forms the toothed belt body and lying along the belt length direction, wherein
    a tooth bottom portion between the toothed portions has an uneven surface formed due to a weave pattern of the woven fabric or a knit loop pattern of the knitted fabric.

2. The toothed belt of claim 1, wherein
    the uneven surface of the tooth bottom portion has an arithmetic mean roughness of 5 µm to 25 µm which is measured based on JIS B0601.

3. The toothed belt of claim 1, wherein a fiber material which forms the nonwoven fabric is nylon fibers.

4. The toothed belt of claim 1, wherein the nonwoven fabric has a basis weight of 200 g/m2 to 600 g/m2.

5. The toothed belt of claim 1, wherein portions of the nonwoven fabric corresponding to the toothed portions are protruded toward the toothed portions to have a thickness that is 50% or more on average of a height of the toothed portion.

6. The toothed belt of claim 1, wherein the woven fabric or the knitted fabric is made of the same fiber material as the fiber material which forms the nonwoven fabric.

7. The toothed belt of claim 1, wherein the woven fabric or the knitted fabric has a basis weight that is 30% to 170% of the basis weight of the nonwoven fabric.

8. The toothed belt of claim 1, wherein each of portions of the woven fabric or the knitted fabric corresponding to the toothed portions has a distal end closest to the corresponding toothed portion at a position that is 60% or more on average of a height of the toothed portion.

9. The toothed belt of claim 1, wherein the woven fabric or the knitted fabric has anisotropic stretch properties, and is arranged such that a direction in which the woven fabric or the knitted fabric is more stretchable aligns with the belt length direction.

10. The toothed belt of claim 1, wherein the portions of the woven fabric or the knitted fabric corresponding to the toothed portions are not in contact with the nonwoven fabric.

11. The toothed belt of claim 1, wherein the portions of the woven fabric or the knitted fabric corresponding to the toothed portions are not exposed on surfaces of the toothed portions, but are buried in the toothed portions.

12. The toothed belt of claim 1, wherein the polyurethane resin which forms the toothed belt body has a hardness of 70° to 100° which is measured based on JIS K7312.

* * * * *